United States Patent
Kruys et al.

(10) Patent No.: US 8,897,800 B2
(45) Date of Patent: Nov. 25, 2014

(54) NETWORK ACQUISITION FOR WIRELESS CLIENTS

(75) Inventors: Johannes Petrus Kruys, Harmelen (NL); David Sheldon Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 695 days.

(21) Appl. No.: 11/508,709

(22) Filed: Aug. 23, 2006

(65) Prior Publication Data

US 2008/0051100 A1 Feb. 28, 2008

(51) Int. Cl.
*H04W 68/00* (2009.01)
*H04W 48/18* (2009.01)
*H04W 64/00* (2009.01)

(52) U.S. Cl.
CPC .............. *H04W 48/18* (2013.01); *H04W 64/00* (2013.01)
USPC ................... 455/456.1; 455/414.1; 455/404.2; 370/328; 370/329

(58) Field of Classification Search
USPC ............... 370/310, 328, 329, 331; 455/404.1, 455/456.1–457, 404.2, 414.2
See application file for complete search history.

(56) References Cited

U.S. PATENT DOCUMENTS

| | | | |
|---|---|---|---|
| 2003/0133421 A1* | 7/2003 | Sundar et al. | 370/328 |
| 2003/0156558 A1* | 8/2003 | Cromer et al. | 370/331 |
| 2004/0072581 A1* | 4/2004 | Tajima et al. | 455/456.1 |
| 2004/0240412 A1* | 12/2004 | Winget | 370/331 |
| 2004/0246922 A1* | 12/2004 | Ruan et al. | 370/331 |
| 2006/0030338 A1* | 2/2006 | Harken et al. | 455/456.6 |
| 2006/0148486 A1 | 7/2006 | Kim et al. | |
| 2007/0025293 A1* | 2/2007 | Choi | 370/331 |

FOREIGN PATENT DOCUMENTS

EP 1370013 A1 1/2004

OTHER PUBLICATIONS

Mlinarsky, Fanny, *Metrics and Methods Bring VoWLAN Success*, Electronic Design, Mar. 2005.
Tillotson, Rob, *Co-Pilot Live GPS Navigation System*, The Gadgeteer, Apr. 12, 2006.
Simone, Dan *802.11k Makes WLANs Measure Up*, NetworkWorld, Mar. 29, 2004.
Office Action for Chinese Patent Application 200780029481.7, Sep. 14, 2010.
Supplementary European Search Report; Reference: P32508EP-PCT; Application No. 07840985.1—1854/2055114; PCT/US2007076023.

* cited by examiner

*Primary Examiner* — Chuong A Ngo
(74) *Attorney, Agent, or Firm* — Baker Botts L.L.P.

(57) ABSTRACT

In one embodiment, a method for facilitating access to a wireless network. A wireless client is operable to determine its current location, select a wireless network based on the location, and connect to the wireless network utilizing network information associated with the location.

33 Claims, 5 Drawing Sheets

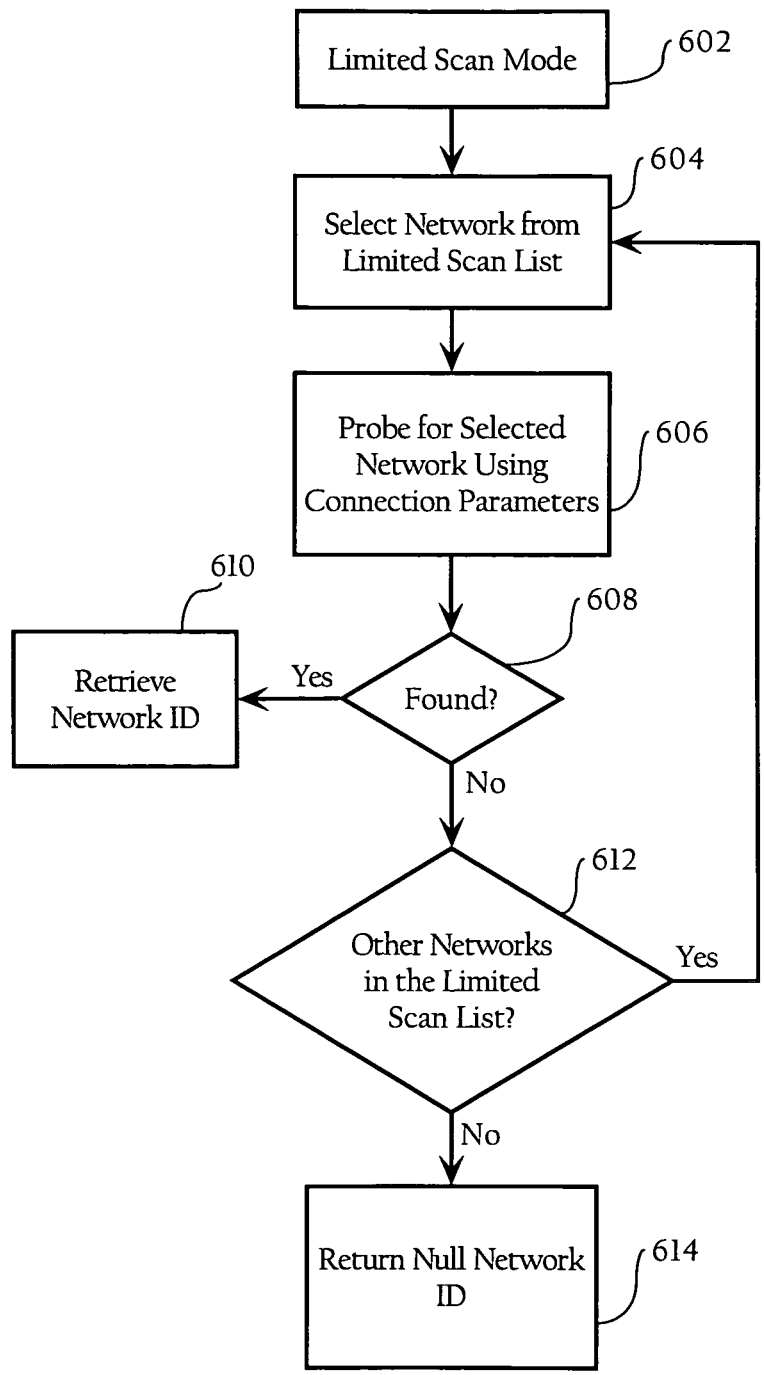
Fig._4

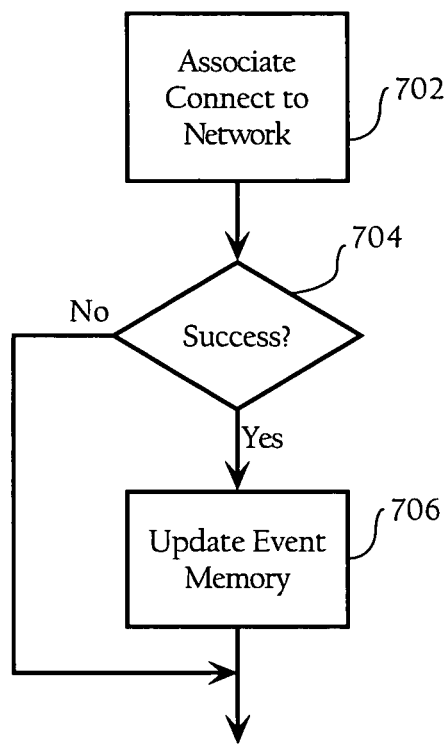
Fig._5

NETWORK ACQUISITION FOR WIRELESS CLIENTS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Certain wireless network protocols assume that wireless clients are constantly able to listen to network signals. This is true even for protocols that support so-called "sleep or power save" modes in which the wireless client spends part of its time with its power switched off or set to a very low level and then "wakes up" to listen for network signals and to keep a network informed of its presence. When the wireless client roams, the wireless client needs to acquire knowledge of the locally available access points, which can be time consuming and energy inefficient, especially in networks that have not been designed to support efficient roaming. The problem is worsened by the fact that the combination of roaming and planned coverage in only specific areas (e.g., hotspots) render the presence of a given service provider at a given location highly unpredictable. Therefore, a wireless client has to expend time and energy in network monitoring and acquisition. This leads to battery depletion, and thus to a bad user experience.

DESCRIPTION OF THE DRAWINGS

FIG. 4 illustrates another example process flow at the wireless client.

FIG. 5 illustrates another example process flow at the wireless client.

DESCRIPTION OF EXAMPLE EMBODIMENTS

Particular embodiments of the present invention facilitate access to wireless networks. According to one implementation of the present invention, a wireless client such as a laptop, portable VoIP phone, etc., may determine its location as well as other network information to intelligently, quickly, and/or efficiently access wireless networks. In one implementation, upon startup or in anticipation of a roam event, the wireless client, rather than expending the resources required to scan the coverage area for available wireless networks, determines its current location and attempts to connect with one or more networks stored in a memory in association with the determined location. As described in further detail below, in one implementation, the wireless client, with the determined location, may then search an event memory for a matching location having one or more associated therewith information regarding one or more wireless networks. In one implementation, the event memory may also store other network information/connection attribute information associated with past network acquisition events. Such information may include, for example, wireless network identifier (e.g., 802.11 service set identifier (SSID) or basic service set identifier (BSSID)) radio frequency (RF) channel, location, user credential types, service provider information, time stamp information, etc. After selecting a wireless network associated with the location, the wireless client may use the connection attribute information to quickly and efficiently access the wireless network. In one implementation, after successfully associating with the wireless network, the wireless client may update the event memory with any new network information for future access.

Figure 1:
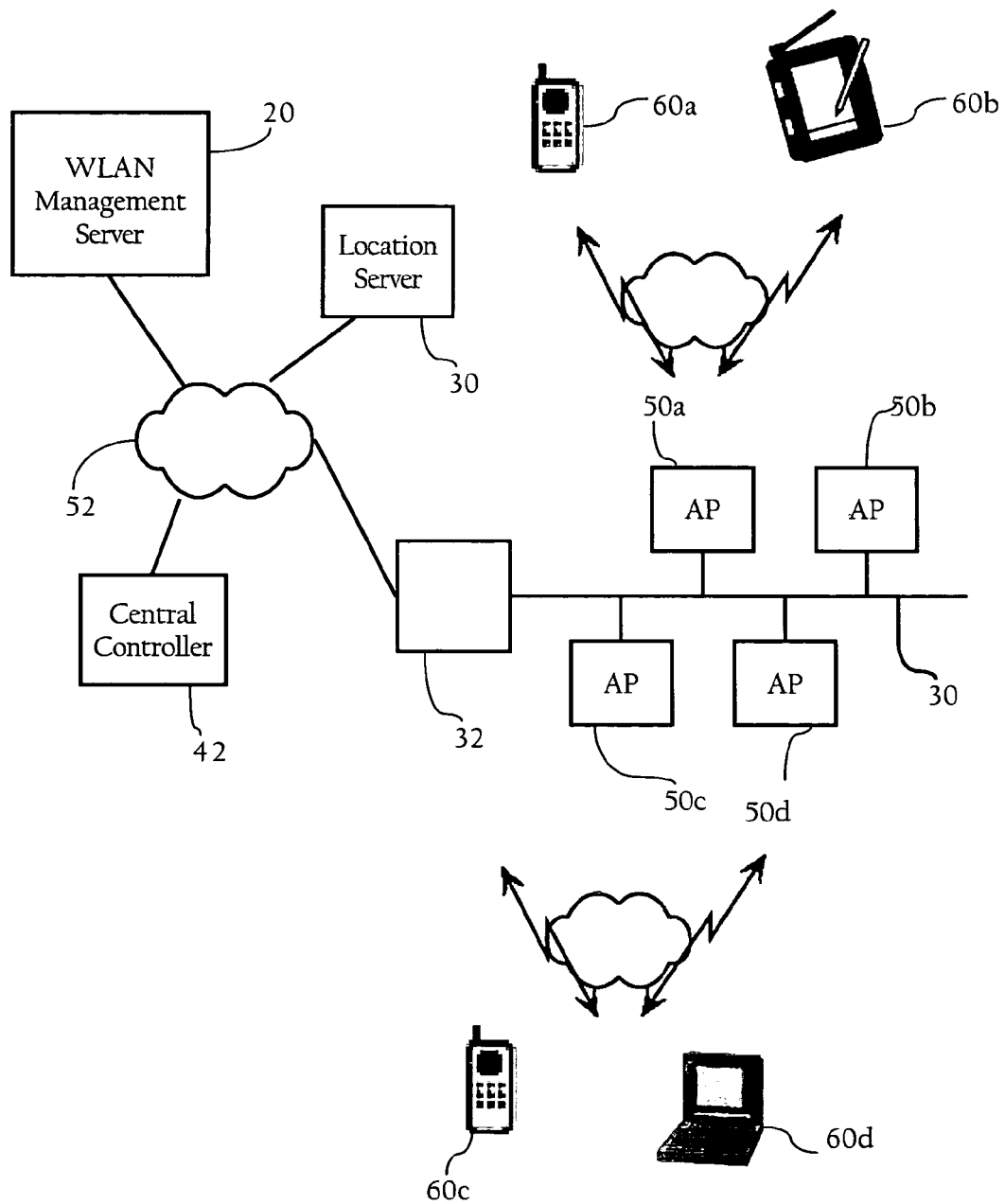
FIG. 1 illustrates an example wireless local area network (WLAN).

FIG. 1 illustrates an example wireless local area network (WLAN). In a specific embodiment of the present invention, the system includes a WLAN management server 20, a location server 30, a central controller 42, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols can be used. The wireless access points 50 may be autonomous or so-called "fat" wireless access points, or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

Figure 2:
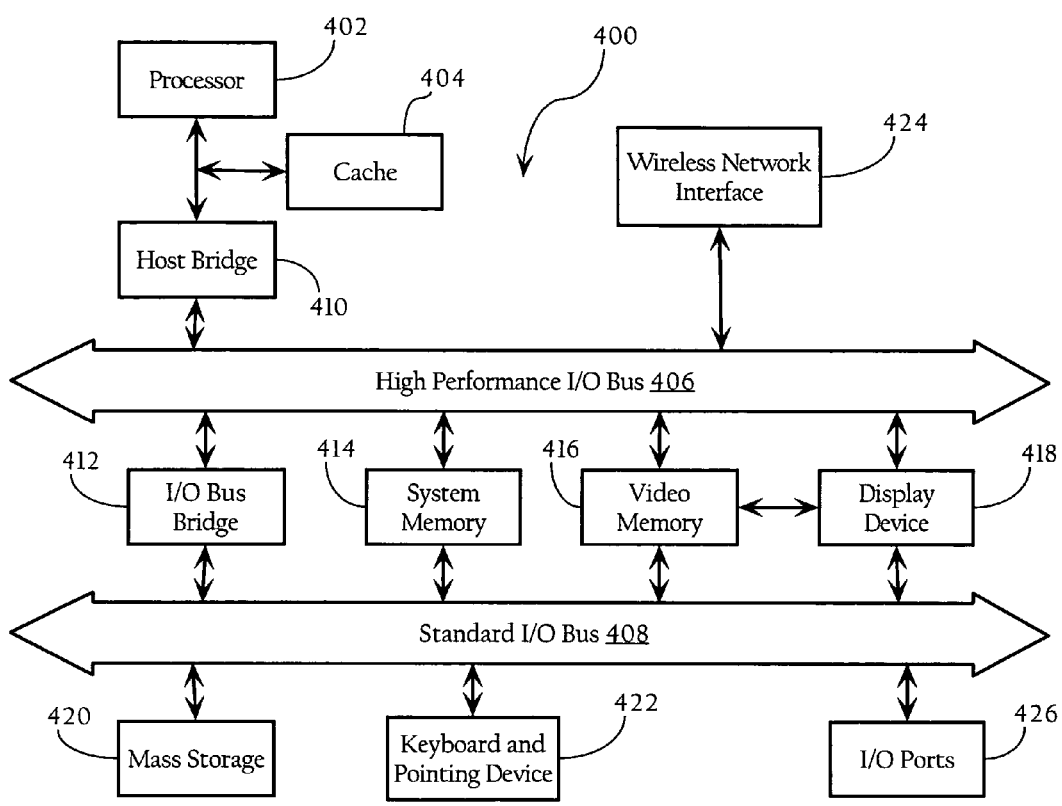
FIG. 2 illustrates example hardware for implementation of a wireless client.

FIG. 2 illustrates example hardware 100 for implementation of a wireless client. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 2 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

While implementations of the present invention enable power-efficient access and roaming for wireless clients that use the IEEE 802.11 protocol, such implementations may also apply to other protocols as well.

The following describes processes that enable a wireless client to intelligently and efficiently access one or more wireless networks based on the current location of the wireless client, and thereby avoiding a full scan and expending resources, such as battery power, required by the full scan.

In one implementation, upon startup or in anticipation of a roam event, the wireless client performs the following process in lieu of automatically performing a full scan of the coverage area for one or more available wireless networks. As described in further detail below, in one implementation, the wireless client determines its location and then attempts to access one or more wireless networks associated with that location in an event memory.

Figure 3:
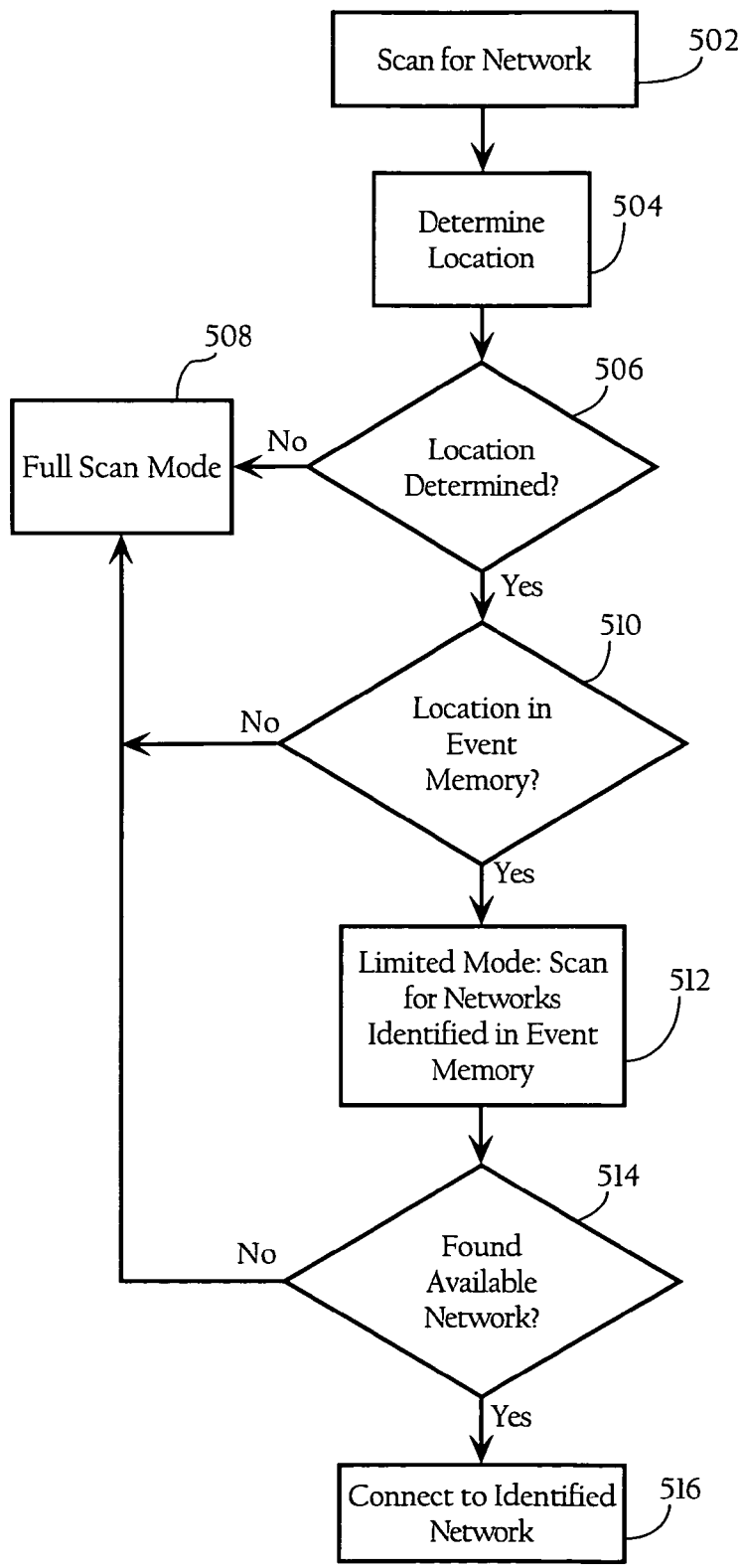
FIG. 3 illustrates an example process flow at the wireless client.

FIG. 3 illustrates an example process flow at the wireless client. As FIG. 3 shows, wireless client 60 first determines its current location (504). In one embodiment, the current location may be determined in a number of ways, for example, by polling a global positioning system device operably attached to the wireless client (if available), receiving the location from beacon frame information (e.g., an 802.11 beacon frame from a wireless access point within range that advertises the location information in a Information Element or other field of the beacon frame), receiving the location via a location service, etc. For example, in one embodiment, a location service may utilize a well-known RF channel common across many locations (e.g., all locations served by the same operator or the same consortium). A wireless client may probe the well-known channels for the location service.

In one embodiment, the wireless client may also receive the current location from the user. For example, wireless client may query the user with a form or other interactive query method, where the user may enter the location using a text-based entry, pull-down menus, custom fields, etc. In one embodiment, wireless client 60 may intelligently infer a location from the beacon frame information (e.g., BSSID, SSID, etc.). In one embodiment, the wireless client is further operable to determine the current location by accessing one or more beacon frames corresponding to a neighboring wireless network infrastructure, and comparing one or more information attributes of the one or more beacon frames to a data store including location entries including neighboring wireless network infrastructure information. For example, if a wireless client receives a beacon whose SSID or BSSID corresponds to a home network of a particular neighbor, the wireless client would then know that it was in the general vicinity of the wireless access point at that home network. There after, the wireless client could limit probing to just the BSSID of the home network.

In one embodiment, one or more locations may be provided by one or more of the above-described methods and all locations may be stored in the event memory. Locations in the event memory can be identified by a unique name, code or other identifier. In addition, in one implementation, the event memory can be a hash table using a hashed value, including at least a location identifier, as a key. Wireless client can employ a variety of search algorithms and techniques (e.g., regular expression searching, hash functions, etc.) to scan the event memory for a matching location. In addition, the time stamps associated with each entry in the event memory, in one implementation, can be used to filter out old information, and/or prioritize the wireless networks in a limited scan list (see below).

Next, wireless client 60 determines if it has identified a current location (506). If a current location is not available, wireless client 60 may execute normal processes (e.g., entering a standard full scan mode) to locate and connect to an available wireless network (508). If a current location is available, wireless client 60 scans/searches an event memory for a matching location (510). In one embodiment, wireless client 60 may utilize an intelligent algorithm to find an appropriate matching location in the event memory. In one embodiment, the event memory may be a cache that stores various network information, which, in one implementation, may be indexed by location. Such network information may include, for example, identifiers corresponding to one or more networks associated with each location. For each wireless network, the event memory may also include other network information/ connection attribute information, which may include, for example, network identifier or name information (e.g., network ID), SSID, BSSID, RF channels, credential types, etc. This network information may be reused for quick and efficient access to a given wireless network. For example, wireless client 60, with knowledge of its current location, can scan the event memory to identify for which network identifiers to scan/probe, and on which RF channel to scan/probe. If the current location does not match any entries in the event memory, wireless client 60 enters the standard full scan mode (508).

If wireless client 60 finds one or more matching locations in the event memory, wireless client 60 enters a limited scan mode, described below (512). In one implementation, a search of the event memory against the current location, assuming one or more matches exist, yields a limited scan list identifying one or more wireless networks. In the limited scan mode, wireless client 60 scans and/or probes the RF coverage area, using information in the event memory (e.g., RF channels, SSIDs, BSSIDs, etc.), to identify one or more available networks in the location. For example, a wireless client may transmit a directed probe request using the network address and RF channel information stored in the event memory. If wireless client identifies an available network during the limited scan/probe (514), it chooses a wireless network from the identified networks and attempts to establish a wireless connection (e.g., in 802.11 an association request) with the selected wireless network. If not, wireless client 60 enters the standard full scan mode (508), where wireless client 60 may scan all available channels to locate one or more available networks and/or service providers.

As discussed above, if wireless client 60 finds the location in the event memory, wireless client 60 connects to one of the identified networks using available access parameters (e.g., RF channels, SSIDs, etc.) stored in the event memory (516). Note that only a limited amount of information needs to be stored since some information can be re-obtained by receiving the beacon. For example, if the BSSID were stored in event memory, the SSID could then be determined by receiving the beacon from the wireless access point with that BSSID. In one embodiment, if more than one network associated with the location is available, wireless client 60 compiles a list of networks associated with the location. In one embodiment, wireless client 60 may automatically select the optimal network for connection. In one embodiment, wireless client 60 may present the list of networks to the user so that the user may select the network. This is useful in cases where a user is in possession of more than one set of security credentials allowing the user access to several different service provider networks. In this case, either client policy or the user could decide which network is preferential and attempt to join that network.

The following description in connection with FIG. 4 describes one process that may be used to implement the limited scan mode (512) of FIG. 3. FIG. 4 illustrates another example process flow at the wireless client 60 during a limited scan mode. As FIG. 4 shows, after wireless client 60 enters the limited scan mode, wireless client 60 selects a first wireless network from the limited scan list generated from searching the event memory (604). In one implementation, the limited scan list may provide a prioritized list of RF channels for each identified wireless network to search when looking for a new network connection. In one embodiment, for a given location, the event memory includes one or more entries. Each entry may include an associated network and other network information, as described above. Next, wireless client 60 probes for the identified/selected network using connection parameters (e.g., SSIDs, BSSIDs, etc.), which are retrieved from the event memory (606). In one implementation, the wireless client may transmit a directed probe request using the information stored in the event memory. In another implementation, the wireless client may simply switch to the RF channel identified in the event memory and passively scan for the network identified in the event memory. Next, wireless client 60 determines if the selected network is found (608). If found, the limited scan mode process returns network information corresponding to the identified network (610). Wireless client 60 may then connect to the network using the identified wireless network.

If the network ID is not found, wireless client 60 determines if other networks are in the limited scan list (612), where wireless client 60 may select another network from the limited scan list if more are available (604). If there is no other network in the limited scan list, the limited scan mode process returns a null network ID (614) to the user. In one embodiment, if no other networks are found in the limited scan list (612), wireless client 60 may optionally probe for identified networks in the limited scan list on all available channels (as opposed to the specific RF channels stored in the event memory). If wireless client 60 finds a network, the limited scan mode process returns one or more identified networks.

In the implementation described above, the limited scan mode process returns the first wireless network that it finds. In an alternative embodiment, in the limited scan mode, wireless client 60 may probe for all networks in the limited scan list, and return network information for all found networks. In one embodiment, the selection of the network with which the wireless client establishes a connection, may be based on a policy or on a user selection.

As discussed below, the wireless client, as it successfully associates with wireless networks records connection parameter information in the event memory for later user. After successfully selecting and associating with a wireless network, the wireless client may update the event memory with new network information/connection attribute information (e.g., RF channel, location, credential, time stamp information, etc.).

FIG. 5 illustrates another example process flow at the wireless client 60 after establishing a connection with a wireless network. As FIG. 5 shows, after wireless client 60 selects a network (either after a full or limited scan), the wireless client attempts to associate with the selected network. If the association/connection is successful (704), wireless client 60 updates its event memory with any connection fingerprint/network information, which may include, for example, the current location, a network identifier, service provider information, SSID, BSSID, current RF channel and other access/connection parameter information, time, day of week, etc. (706). In one implementation, the current location can be determined, as discussed above, by polling a location sensor (e.g., GPS), directly querying the user, obtaining the location information from information advertised in a beacon frame, and/or obtaining the information by querying a location server 20 in the wireless network. Wireless client 60 may utilize the newly stored network information, as discussed above, for future connections to the network.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more storage media for execution and when executed operable to:
   query, by a wireless client, a user of the wireless client to provide a current location of the wireless client through at least one of a text-based entry and a menu selection;
   receive, at the wireless client, the current location of the wireless client provided by the user of the wireless client through the at least one of a text-based entry and a menu selection;
   access an event memory of the wireless client storing wireless network access information for one or more wireless networks in association with corresponding locations;
   probe for one or more wireless networks using network access information associated with the current location in the event memory by transmitting directed probe requests addressed to at least one of the one or more wireless networks that are associated with the current location of the wireless client; and
   update the event memory after successful association with a new wireless network by adding a new entry in the event memory, the new entry including the current location of the wireless client that was provided by the user through the at least one of a text-based entry and a menu selection and network access parameter information for the new wireless network.

2. The logic of claim 1 wherein the logic is further operable to connect to a wireless network identified during the probe.

3. The logic of claim 1 wherein the logic is further operable to determine the current location by performing one or more of accessing one or more position sensors, receiving the current location from beacon frame information, receiving the current location via a location service, receiving the current location from a user, and inferring the current location from one or more detected attributes.

4. The logic of claim 1 wherein the logic is further operable to scan the event memory for one or more matching locations based on the current location.

5. The logic of claim 1 wherein the wireless network access information comprises one or more of identifier information, service provider information, service set identifier, basic service set identifier, one or more radio frequency channel, and credential types.

6. The logic of claim 1 wherein the logic is further operable to retrieve, from the event memory, a network identification of the selected network.

7. The logic of claim 1 wherein the event memory for a given wireless network stores one or more of a wireless network identifier and a RF channel.

8. The logic of claim 7 wherein the logic is further operable to generate a limited scan list based on wireless networks in the event memory that are associated with the current location.

9. The logic of claim 8 wherein the logic is further operable to probe for a network identified in the limited scan list using the corresponding RF channel in the event memory.

10. The logic of claim 1 wherein the logic is further operable to determine the current location by accessing one or more beacon frames corresponding to a neighboring wireless network infrastructure, and comparing one or more information attributes of the one or more beacon frames to a data store including location entries including neighboring wireless network infrastructure information.

11. The logic of claim 1, wherein the wireless network access information comprises at least one or more security credentials.

12. A method comprising:
    determining, at a wireless client, a current location of the wireless client;
    accessing, at the wireless client, an event memory storing wireless network access information for one or more wireless networks in association with corresponding locations;
    probing, at the wireless client, for one or more wireless networks using network access information associated with the current location in the event memory by transmitting directed probe requests addressed to at least one of the one or more wireless networks that are associated with the current location of the wireless client; and
    updating the event memory after successful association with a new wireless network by adding a new entry in the event memory, the new entry including a location of the wireless client at the time of updating the event memory and network access parameter information for the new wireless network.

13. The method of claim 12 further comprising connecting to a wireless network identified during the probe.

14. The method of claim 12 further comprising determining the current location by performing one or more of accessing one or more position sensors, receiving the current location from beacon frame information, receiving the current location via a location service, receiving the current location from a user, and inferring the current location from one or more detected attributes.

15. The method of claim 12 further comprising scanning the event memory for one or more matching locations based on the current location.

16. The method of claim 12 wherein the wireless network access information comprises one or more of identifier information, service provider information, service set identifier, basic service set identifier, one or more radio frequency channel, and credential types.

17. The method of claim 12 further comprising retrieving, from the event memory, a network identification of the selected network.

18. The method of claim 12 wherein the event memory for a given wireless network stores one or more of a wireless network identifier and the RF channel.

19. The method of claim 18 further comprising generating a limited scan list based on wireless networks in the event memory that are associated with the current location.

20. The method of claim 19 further comprising probing for a network identified in the limited scan list using the corresponding RF channel in the event memory.

21. The method of claim 12 further comprising determining the current location by accessing one or more beacon frames corresponding to a neighboring wireless network infrastructure, and comparing one or more information attributes of the one or more beacon frames to a data store including location entries including neighboring wireless network infrastructure information.

22. The method of claim 12, wherein the wireless network access information comprises at least one or more security credentials.

23. A system comprising:
a wireless network infrastructure node operable to communicate with wireless clients; and
a wireless client operable to:
query a user of the wireless client to provide a current location of the wireless client through at least one of a text-based entry and a menu selection;
receive the current location of the wireless client provided by the user of the wireless client through the at least one of a text-based entry and a menu selection;
access an event memory containing associations between locations and search for one or more wireless networks based on the current location;
probe for one or more wireless networks using network access information associated with the current location in the event memory by transmitting directed probe requests addressed to at least one of the one or more wireless networks that are associated with the current location of the wireless client;
connect to the selected wireless network utilizing network information associated with the current location; and
update the event memory after successful association with a new wireless network by adding a new entry in the event memory, the new entry including the current location of the wireless client that was provided by the user through the at least one of a text-based entry and a menu selection and network access parameter information for the new wireless network.

24. The system of claim 23 wherein the wireless client is further operable to connect to a wireless network identified during a probe.

25. The system of claim 23 wherein the wireless client is further operable to determine the current location by performing one or more of accessing one or more position sensors, receiving the current location from beacon frame information, receiving the current location via a location service, receiving the current location from a user, and inferring the current location from one or more detected attributes.

26. The system of claim 23 wherein the wireless client is further operable to scan the event memory for one or more matching locations based on the current location.

27. The system of claim 23 wherein the wireless network access information comprises one or more of identifier information, service provider information, service set identifier, basic service set identifier, one or more radio frequency channel, and credential types.

28. The system of claim 23 wherein the wireless client is further operable to retrieve, from the event memory, a network identification of the selected network.

29. The system of claim 23 wherein the event memory for a given wireless network stores one or more of a wireless network identifier and a RF channel.

30. The system of claim 29 wherein the wireless client is further operable to generate a limited scan list based on wireless networks in the event memory that are associated with the current location.

31. The system of claim 30 wherein the wireless client is further operable to probe for a network identified in the limited scan list using the corresponding RF channel in the event memory.

32. The system of claim 23 wherein the wireless client is further operable to determine the current location by accessing one or more beacon frames corresponding to a neighboring wireless network infrastructure, and comparing one or more information attributes of the one or more beacon frames to a data store including location entries including neighboring wireless network infrastructure information.

33. The system of claim 23, wherein the wireless network access information comprises at least one or more security credentials.

* * * * *